UNITED STATES PATENT OFFICE.

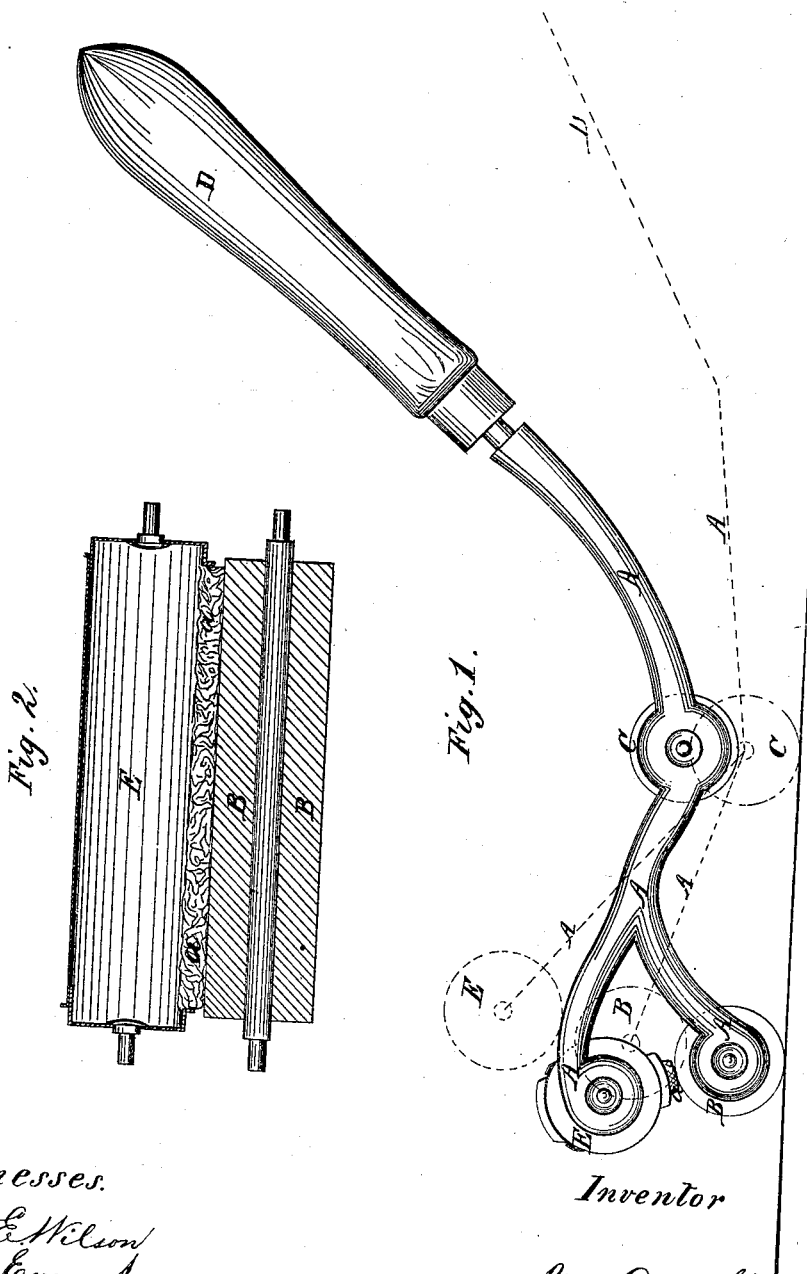

M. ORMSBEE, OF NEW YORK, N. Y.

APPARATUS FOR PASTING AND MOUNTING PHOTOGRAPHS, &c.

Specification forming part of Letters Patent No. 39,166, dated June 7, 1863.

*To all whom it may concern:*

Be it known that I, M. ORMSBEE, of the city, county, and State of New York, have invented certain new and useful Improvements in an Apparatus for Pasting and Mounting Photographs, Labeling, Putting on Wall-Paper, &c.; and I do hereby declare that the following is a full, clear, and exact description thereof, reference being had to the accompanying drawings, making a part of this specification, in which—

Figure 1 represents a side view of the same, and Fig. 2 represents a longitudinal vertical section through the paste-receptacle, sponge, and the pasting-roller.

To enable others skilled in the art to make and use my invention, I will proceed to describe the same with reference to the drawings.

A is a frame carrying two rollers, B C, which are composed of or covered with rubber, and arranged in said frame in different planes with regard to the handle D of the apparatus. Above the roller B there is a paste-reservoir, E, furnished with a sponge, a, or any other equivalent absorbing or filtering material for allowing the paste to pass through from the reservoir onto said roller B, and thus keeping said roller supplied with paste. The paste reservoir or receptacle may turn on its bearings, so as to give more or less contact-surface between the sponge and the roller B, or such other adjustment as will regulate the supply of paste to said roller.

The roller B is designed for applying the paste to the photograph, picture, label, or paper that is to be pasted upon any other material, and the roller C is designed for rolling down or pressing the two things smoothly together. That this putting on of the paste and the rolling and pressing down may be done with one and the same instrument without soiling the thing to be pasted or mounted, the two rolls are set in different planes with regard to the handle D, as shown in the drawings, Fig. 1, by black and red lines. When the paste is being applied, the instrument or apparatus is held in the position shown by the black lines, and when the thing furnished with the paste is to be rolled or pressed down onto or against the thing to which it is to be pasted, then the instrument is put into the position shown by the red lines, which throws up the paste-supplying roller B, and brings down the pressing-roller C. Thus when one roll is in active duty the other is out of the way, and so vice versa, and by this means there is no danger of soiling the photograph, picture, label, paper, or whatever may be pasted or mounted by it, while the manipulation is quick, and can be readily carried on with very great dispatch.

By using rubber for a covering for the pasting and rubbing-down rolls the apparatus can be kept clean, as the rolls can be readily washed without injury to them. Besides, the peculiar texture and elasticity of prepared rubber on the rubbing-down roll fits it expressly for this purpose, as it makes a perfectly smooth and regular surface, without which a photograph or picture loses much of its effect.

Gutta-percha or any other gum possessing elasticity with non-absorbing properties, so that the rolls may be kept clean, may be substituted for the vulcanized or other rubber covering.

Having thus fully described my invention, what I claim therein as new, and desire to secure by Letters Patent, is—

1. Covering the pasting and rolling-down or pressing rollers with rubber or its equivalent, substantially as and for the purpose described.

2. The arranging of the pasting and pressing-down rollers in different planes with regard to the handle, substantially as described.

3. The combination of the paste-reservoir, pasting and pressing rolls, and frame and handle, for the purpose of pasting and pressing or rubbing down with one instrument, substantially as described.

M. ORMSBEE.

Witnesses:
 WM. JAMIESON,
 EMMA BOGERT.